United States Patent [19]

Krumpholz et al.

[11] 4,444,046

[45] Apr. 24, 1984

[54] DEVICE FOR INDICATING THE INSTANTANEOUS FUEL CONSUMPTION OF AN AUTOMOTIVE VEHICLE

[75] Inventors: Josef R. Krumpholz, Karben; Karl-Martin Medler, Frankfurt am Main, both of Fed. Rep. of Germany

[73] Assignee: VDO Adolf Schindling AG, Frankfurt am Main, Fed. Rep. of Germany

[21] Appl. No.: 351,807

[22] Filed: Feb. 24, 1982

[30] Foreign Application Priority Data

Mar. 4, 1981 [DE] Fed. Rep. of Germany ....... 3108122

[51] Int. Cl.³ .......................................... G01L 23/24
[52] U.S. Cl. ................................................... 73/113
[58] Field of Search ........................... 73/113, 114, 115

[56] References Cited

U.S. PATENT DOCUMENTS 4,327,557 5/1982 Fiala ...................................... 73/115

FOREIGN PATENT DOCUMENTS 764857 1/1957 United Kingdom .................. 73/113

*Primary Examiner*—James J. Gill
*Attorney, Agent, or Firm*—Martin A. Farber

[57] ABSTRACT

A device for indicating the instantaneous fuel consumption of an automotive vehicle with spark ignition engine in which the free end of a Bourdon tube (1) of a pressure gauge is blocked by a hinged armature (7) of a hinge-armature relay (4) as long as a circuit is not closed by engagement of the direct drive of the automotive vehicle provided with the device so that the hinge-armature relay (4) is energized and the hinged armature (7) is swung away. By this mechanical barrier the result is obtained that the pressure gauge can operate only when the direct drive is engaged.

9 Claims, 1 Drawing Figure

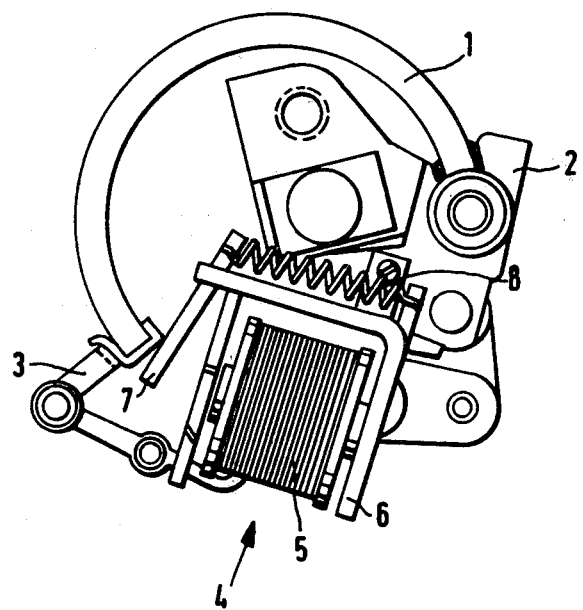

DEVICE FOR INDICATING THE INSTANTANEOUS FUEL CONSUMPTION OF AN AUTOMOTIVE VEHICLE

The present invention relates to a device for indicating the instantaneous fuel consumption of an automotive vehicle with spark-ignition or Otto engine, which has a pressure gauge, particularly a Bourdon pressure gauge, which is connected to the intake pipe of the engine and which furthermore has means for placing the pressure gauge in operation in direct drive.

The problem to be solved by the invention may be seen by considering an indicator device wherein the pressure chamber of the pressure gauge is provided with a vent valve which closes upon engagement of direct drive. In this way a vacuum can then build up in the pressure chamber so that the desired indication of the fuel consumption is obtained. If direct drive is again disengaged, air flows through the vent valve into the pressure chamber, as a result of which the device becomes inoperative so that no indication appears. In this way the result is obtained that the fuel consumption is indicated only in direct drive, as is desirable since otherwise different scales would have to be provided for the corresponding multiplication in the individual gears, so that rapid reading of the device would be impossible.

Since devices for indicating fuel consumption are instruments which should be present as far as possible in every car in order to obtain the smallest possible fuel consumption it is necessary to be able to manufacture these devices as inexpensively as possible. However, in the prior art device the vent valve results in a considerable expense since it must operate very precisely upon every upshift into direct drive and upon disengagement of the drive. When the vent valve is open there is the danger that dirt and moisture contained in the outside air will enter the pressure chamber and lead to damage there. It is also possible that the vent valve, due to the presence of dirt, will no longer close completely so that the device will give an erroneous reading.

The object of the present invention is to develop a device of the aforementioned type for indicating the instantaneous consumption of fuel which can be manufactured as economically as possible and which operates reliably under the relatively rough operating conditions prevailing in the car.

This object is obtained in accordance with the invention by a mechanical barrier (for example hinged armature relay 4) for blocking the pressure gauge in all non-direct gears of the car.

By this development the pressure gauge is continuously blocked in a simple manner when direct drive (normally the highest gear is a set of drive gears of the vehicle transmission) is not engaged so that there can be no indication. The device of the invention is economical to manufacture since the mechanical barrier can be made very simply. In contradistinction to the vent valve of the prior art device it need not operate particularly precisely so that it need not be manufactured with high precision nor installed particularly accurately. It is a strong, dependably operating part. Furthermore the barrier can be mounted at very different places in the pressure gauge. The decisive factor is merely that the barrier be able to block those parts which must move upon a change in pressure in order to produce an indication.

In accordance with one preferred embodiment of the invention the barrier has a latch (hinged armature 7) which is urged in the blocking position by spring force, and an electromagnet (exciter coil 5, yoke 6) which moves said latch into release position upon excitation of the coil being coordinated to this latch. With this development, a circuit which feeds the electromagnet can be closed upon engagement of direct drive, with the result that the latch moves into the disengaged position and thus frees the pressure gauge so that the vacuum produces an indication.

The embodiment is characterized by the fact that the pressure gauge has a Bourdon tube (1) the free end of which rests against a barrier (hinged armature 7) when direct drive is not engaged and by the fact that it is particularly simple and mechanically stronger since that part of the pressure gauge which produces the setting force for the pointer of the indicating device is blocked.

The embodiment in which the barrier is formed by a hinged-armature relay (4) whose armature (7) when not excited rests, due to the force of a tension spring (8), against the free end of the Bourdon tube (1) is advantageous since such hinged armature relays are constructed in large quantities for other measuring devices and therefore can be manufactured economically or obtained on the market. The hinged-armature can in this embodiment also be so dimensioned that it not only blocks the Bourdon pressure gauge but also positively moves it into zero position so that the device always gives a zero reading when it is blocked by the unengaged direct drive and thus disconnected.

The invention admits numerous possible embodiments.

A preferred embodiment is shown in the drawing and will be described below.

The drawing shows the inside of a pressure gauge having the structural parts essential for the invention.

This pressure gauge has a Bourdon tube 1 which is fastened to a tube holder 2. The Bourdon tube 1 has the shape of a circular arc. The free end of the Bourdon tube 1 is connected, in a manner not shown in the drawing, by a connecting rod 3 to a dial train by which a pointer (also not shown) is driven.

The inside of the Bourdon tube has a permanent pressure connection to the intake connection of the spark-ignition engine of the automotive vehicle on which the device is installed. Depending on the pressure conditions prevailing at the intake connection, the Bourdon tube 1 will curve to a greater or lesser extent so as to produce an indication which corresponds to the pressure. In the position shown in the drawing, the Bourdon tube 1, however, is prevented by a barrier from curving further. The pressure gauge is therefore shown in the drawing in its blocked condition.

The barrier consists of an ordinary commercial hinged-armature relay 4 which has an exciter coil 5, a yoke 6 and a hinged armature 7. The hinged armature 7 is urged by a tension spring 8 in a direction in which the hinged armature 7 rests against the free end of the Bourdon tube 1 and prevents the latter from curving more, thus blocking the pressure gauge.

The device of the invention operates as follows. If the direct drive of the vehicle is engaged, a circuit is closed by means of a switch arranged in the vicinity of the gear shift lever. In this way the exciter coil 5 is provided with current with the result that the hinged armature 7 is attracted and the free end of the Bourdon tube 1 is thus released. Thus the pressure gauge is ready for operation as long as direct drive remains engaged. If direct drive is again disengaged, then the tension spring 8 pulls the hinged armature 7 back against the free end of the Bourdon tube 1. As a result the pointer of the pressure gauge moves back to zero. Furthermore, the pressure gauge is blocked by this so that, despite the varying pressure conditions at the intake connection in the different gears, no indication is produced.

In conclusion it may be pointed out that the barrier can also be developed in some entirely different manner which is obvious to the man skilled in the art than by means of the hinged-armature relay shown in the drawing. For example, a latch could be provided which is held in blocking position in a notch by means of a spring. In this case, with the pressure gauge blocked, the force produced by the Bourdon tube 1 would be conducted directly via the notch into the housing of the pressure gauge while in the case of the embodiment shown the tension spring 8 must be sufficiently strong that the hinged armature 7 cannot be swung by the free end of the Bourdon tube 1.

We claim:

1. In a device for indicating the instantaneous fuel consumption of an automotive vehicle with spark-ignition or Otto engine, which vehicle has a pressure gauge including a Bourdon tube, the tube of said gauge being connectable to an intake pipe of the engine and which vehicle has means for placing the pressure gauge in operation only when the transmission is in the highest gear of a set of driving gears, the improvement comprising
    a mechanical barrier means for blocking said pressure gauge in all gears of said set of gears of the vehicle except said highest gear, and wherein
    a free end of said tube presses against said barrier means except during engagement of said highest gear of the transmission when said free end is spaced apart from said barrier means.

2. The device as set forth in claim 1, wherein
    said barrier means includes a latch which is urged in a blocking position by spring force, and
    said improvement further comprises an electromagnet means coordinated to said latch for operatively moving said latch into a disengaged position upon engagement of the direct drive.

3. The device as set forth in claim 2, further comprising
    a circuit feeding said electromagnet means, said circuit being closable upon engagement of direct drive, wherein said latch moves into the disengaged position upon energization of said electromagnet means, thus freeing the pressure gauge to produce an indication in response to a vacuum.

4. The device as set forth in claim 1, wherein
    said free end of said Bourdon tube is positioned along a path of movement of said barrier means.

5. The device as set forth in claim 4, wherein said barrier means includes
    a hinged-armature relay having an armature, the latter when not excited resting due to the force of a tension spring, against the free end of the Bourdon tube.

6. The device as set forth in claim 4, wherein
    said Bourdon tube has the shape of a circular arc,
    the free end of the Bourdon tube being connected via a connecting rod to a dial train by which a pointer is driven.

7. In a device for indicating the instantaneous fuel consumption of an automotive vehicle with spark-ignition or Otto engine, which vehicle has a pressure gauge, particularly a Bourdon pressure gauge, which gauge is connectable to an intake pipe of the engine and which vehicle has means for placing the pressure gauge in operation only when the transmission is in the highest gear of a set of driving gears, the improvement comprising
    a mechanical barrier means for blocking said pressure gauge in all gears of said set of gears of the vehicle except said highest gear, and wherein
    said barrier means is a hinged armature relay.

8. In a device for indicating the instantaneous fuel consumption of an automotive vehicle with spark-ignition or Otto engine, which vehicle has a pressure gauge, particularly a Bourdon pressure gauge, which gauge is connectable to an intake pipe of the engine and which vehicle has means for placing the pressure gauge in operation only when the transmission is in the highest gear of a set of driving gears, the improvement comprising
    a mechanical barrier means for blocking said pressure gauge in all gears of said set of gears of the vehicle except said highest gear, and
    an electric circuit responsive to a gear connection of said vehicle for operating said barrier means to unblock said pressure gauge, and wherein said barrier means is operative to restrict movement of said tube.

9. In a pressure gauge formed of a tube connectable to a region of pressure to be measured, a first portion of said tube being secured to a frame of said gauge while a second portion of said tube is free to move under influence of said pressure, which gauge is to be deactivated during a predetermined condition, the improvement comprising
    an arm connectable to an ,pf,cato₃ of saif gauge apf bg,pg cowplgf to said second portion for movement therewith during changes of pressure, and
    means supported by said frame and actuatable by a remote signal for mechanically blocking said movement during said predetermined condition.

* * * * *